United States Patent
Herdeg et al.

(10) Patent No.: US 6,440,595 B1
(45) Date of Patent: Aug. 27, 2002

(54) FUEL CELL SYSTEM

(75) Inventors: Wolfgang Herdeg, Walddorfhäslach (DE); Thomas Zapp, Dortmund (DE)

(73) Assignees: Siemens AG, München (DE); Vodafone AG, Düsseldorf (DE)

(*) Notice: Subject to any disclaimer, the term of this patent is extended or adjusted under 35 U.S.C. 154(b) by 59 days.

(21) Appl. No.: 09/591,667

(22) Filed: Jun. 12, 2000

(30) Foreign Application Priority Data

Jun. 14, 1999 (DE) .......................................... 199 28 068

(51) Int. Cl.⁷ ................................................ H01M 8/04
(52) U.S. Cl. ............................. 429/26; 429/17; 429/19; 429/13; 429/20; 429/24; 429/34; 429/39; 429/12
(58) Field of Search .............................. 429/26, 12, 13, 429/17, 19, 20, 24, 34, 39

(56) References Cited

U.S. PATENT DOCUMENTS 5,401,589 A * 3/1995 Palmer et al. ................ 429/13
6,013,385 A * 1/2000 DuBose ....................... 429/17

* cited by examiner

*Primary Examiner*—Gabrielle Brouillette
*Assistant Examiner*—Angela J. Martin
(74) *Attorney, Agent, or Firm*—Cohen, Pontani, Lieberman & Pavane

(57) ABSTRACT

Disclosed is a fuel cell system comprising a fuel cell which includes a feed line for a fuel and a feed line for an oxidant. To ensure adequate moistening of the fuel cell membrane even during the start-up phase of the fuel cell, a fluid reservoir containing a fluid is provided, via which the fuel and/or the oxidant are humidified before entering the fuel cell. Thus adequate moistening of the fuel cell membrane is ensured even during the start-up phase of the fuel cell. To prevent the fluid from freezing at low temperatures, mixing of the fluid with an antifreeze is provided for. To ensure that the antifreeze will not pass into the fuel cell, the fluid drawn from the fluid reservoir is heated sufficiently by a heating means for evaporation of the antifreeze and separation from the fluid to take place. The heating means can include a flow conduit designed as a closed system. The flow conduit has a heating medium flowing through it which, prior to giving off heat to the fluid, is heated via a burner.

26 Claims, 1 Drawing Sheet

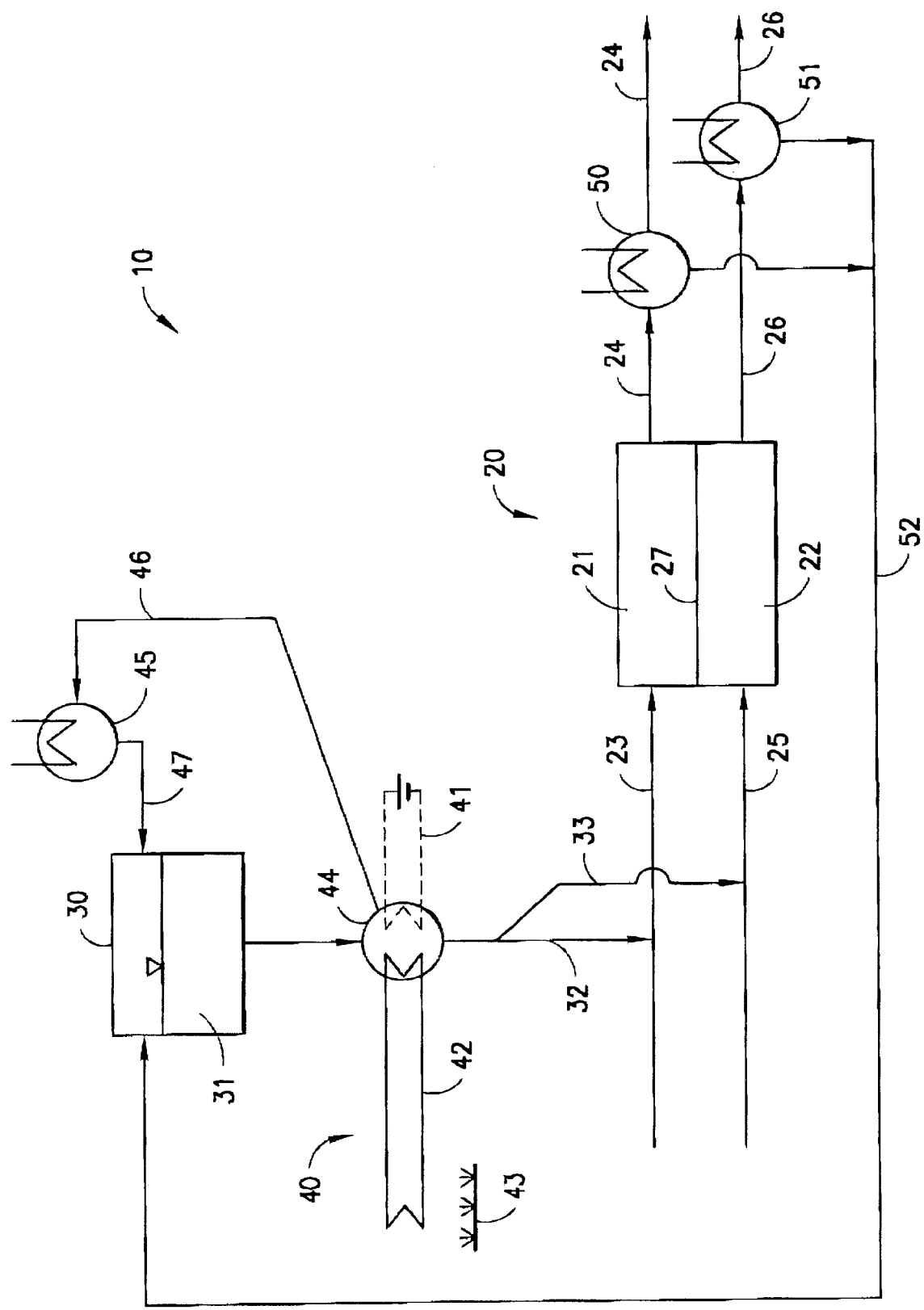

FUEL CELL SYSTEM

BACKGROUND OF THE INVENTION

The present invention relates to a fuel cell system comprising a fuel cell which includes a feed line for a fuel and a feed line for an oxidant.

Fuel cells have been known for a long time and have become considerably more important in recent years, particularly in the automotive industry.

Similarly to battery systems, fuel cells generate electrical energy by chemical means. In a fuel cell, the individual reactants are supplied continuously (anode gas and cathode gas) and the reaction product is discharged continuously (anode off-gas and cathode off-gas). Fuel cells operate on the principle that electrically neutral molecules or atoms combine with one another and exchange electrons in the process. This phenomenon is referred to as a redox process. In the fuel cell, the oxidation and reduction processes are spatially separated, which can be achieved via a membrane, for example. Such membranes have the property of exchanging protons, but retaining gases. The electrons given off in the reduction can be passed as a current through a load, for example the electric motor of a motor vehicle.

Examples of gaseous reactants used for a fuel cell are hydrogen as the fuel gas (anode gas) and oxygen as the oxidant (cathode gas). If the fuel cells are to be operated with a fuel which is readily available and can easily be stored, e.g. natural gas or methanol, these hydrocarbons must first be converted into a hydrogen-rich gas, which can be achieved, for example, by reforming.

For a fuel cell to properly function, the membrane must be moistened continuously during operation. Since generating current and heat in the fuel cell produces water in the corresponding reactions, this water is used, as a rule, to moisten the membrane.

Moistening the fuel cell membrane by the customarily employed manner has a drawback, however, in that, particularly during the start-up phase of the fuel cell system, no water has at that time yet been produced. Nevertheless, even at that time it is necessary to moisten the membrane of the fuel cell to prevent damage.

U.S. Pat. No. 5,786,104 discloses a fuel cell system having one feed line and discharge line each for a fuel and for an oxidant. The feed line for the fuel and/or the feed line for the oxidant is connected to a water reservoir. The feed lines are each provided with a static mixer which can be heated to evaporate the water supplied from the water reservoir and thus to moisten the fuel and/or oxidant which is supplied to the fuel cell. The problems associated with humidification at temperatures below the freezing point of water are not discussed in this publication.

On the basis of the prior art described, it is therefore an object of the present invention to provide a fuel cell system which avoids the drawbacks described. A particular object is to provide a fuel cell system in which, especially even during the start-up procedure of the fuel cell, sufficient moisture is available for moistening the fuel cell membrane and which is fully functional even at ambient temperatures below the freezing point of water.

SUMMARY OF THE INVENTION

The above stated object is obtained by a fuel cell system of the invention. In the fuel cell system, a heating means is provided to heat the fluid present in the fluid reservoir. The heating means is disposed in the feed line for the fuel and/or in the feed line for the oxidant and is selected so as to provide sufficient heating power to completely evaporate an antifreeze present in the fluid. The system includes apparatus for collecting, condensing and recycling the evaporated antifreeze into the fluid reservoir.

Via the fluid reservoir it is possible to humidify the fuel and/or the oxidant, the fuel cell membrane subsequently being moistened by the humidified gas streams. In particular, this ensures that the fuel cell membrane is moistened even during the start-up procedure of the fuel cell, since the gas streams entering the fuel cell initially will be sufficiently humid to moisten the fuel cell membrane thus preventing damage to the membrane as could arise if the membrane dries out.

The fluid contained in the fluid reservoir is therefore able, in particular, to bridge the interval between start-up and production of water in the fuel cell.

The fuel used for the fuel cell can, for example, be hydrogen obtained from methanol, gasoline, natural gas, methane, coal gas, biogas or the like, but is not limited thereto. The oxidant used can advantageously be oxygen.

If the fluid present in the fluid reservoir is water, methanol or some other antifreeze is additionally admixed to lower the freezing point. In any case, the antifreeze is selected so as to have a lower boiling point than the fluid. In this context, the heating means in the connection line of the fluid container for the feed line for the fuel and/or for the feed line for the oxidant is provided to distill the antifreeze from the water to ensure that the fuel cell is supplied with pure water only. Expediently, the heating means is disposed e.g. in an injection nozzle through which the water can be injected into the gas stream of the fuel and/or the oxidant for the fuel cell. The heating means is designed so as to provide sufficient thermal energy for complete evaporation of the antifreeze present in the water stream flowing through the connection line, before the water is mixed with the respective gas stream to be supplied to the fuel cell. The evaporated antifreeze is collected by means of suitable arrangements, is condensed and then recycled into the fluid reservoir.

The invention overcomes a hitherto significant problem, i.e. that the fuel cell system can be operated even at temperatures below 0° C. The difficulty, after all, is that the fluid in the fluid reservoir, particularly if water is used, can freeze at such low temperatures. Consequently, adequate moistening of the fuel cell membrane during the start-up phase of the fuel cell would no longer be guaranteed. The antifreeze prevents freezing of the fluid. Using the heating means ensures that the antifreeze present in the fluid is distilled out before the fluid is admixed with the gas stream to be supplied to the fuel cell.

In a preferred embodiment, a fluid reservoir is provided to hold a fluid for humidifying the fuel and/or the oxidant. Advantageously, water is used as an appropriate fluid, water being suitable for humidifying the oxidant and/or the fuel and for moistening the membrane of the fuel cell.

Depending on the requirements and the specific application it is possible for only one of the oxidant or fuel to be humidified. Equally, however, it is possible to humidify both the fuel and the oxidant.

The heating means is preferably an electric heater. The electric heater is advantageously disposed in the fluid reservoir. The electrical energy required is initially, i.e. while the fuel cell is being started up, supplied by an electric battery. The electric heater can for example be configured as a heating filament, heating coil or the like, without being limited thereto, however.

In another embodiment, the heating means can include a flow conduit for a heating medium. In such an arrangement, the flow conduit is a coiled pipe or the like to increase its heat exchange area. The flow conduit has the heating medium flowing through it resulting in heat being exchanged between the heating medium and the fluid.

The heating means is preferably designed as a closed system. Thus the quantity of heating medium circulating in the flow conduit can be reduced, since no heating medium can escape from the flow conduit during a circulation cycle.

Advantageously, provision is made, in the flow conduit, for a delivery means for the heating medium. Via such a delivery means it is possible to adjust the flow rate of the heating medium within the flow conduit as required. The fact is that the flow rate of the heating medium affects the rate at which heat is exchanged between the heating medium and the fluid present in the fluid reservoir.

Different designs are possible for the delivery means depending on the type of heating medium used. If, for example, a liquid heating medium such as water, oil or the like is used, the delivery means is preferably a pump. If, for example, the heating medium used is a gas such as air or the like, the delivery means is preferably a blower. The invention is not limited to these delivery means.

In a further embodiment, a heating element is provided for heating the heating medium. Preferably, the heating element is in the form of a burner, especially a catalytic burner. By means of the burner, the heating medium contained in the flow conduit is heated to the required temperature before being used to heat the fluid. However, alternative embodiments of the heating element, e.g. in the form of an electric heating element, are also possible. The invention is not limited to specific embodiments of the heating element.

The water formed in the fuel cell as a reaction product is discharged from the fuel cell together with the off-gas. Advantageously, provision is therefore made, in the discharge line for the fuel and/or in the discharge line for the oxidant, for an apparatus for condensing out fluid. The apparatus for condensing out fluid is connected to the fluid reservoir. This arrangement allows for the recovery of the product water produced as current is generated in the fuel cell. Generally, the water present in the off-gas stream of the fuel cell is usually in the form of water vapor since the off-gas stream of the fuel cell is very warm. The apparatus for condensing out liquid enables conversion of the water vapor to the liquid state, so that the water can then be utilized for further processes within the environment of the fuel cell, i.e. especially for humidification of the fuel and/or the oxidant.

The apparatus for condensing out liquid can be provided in the discharge line for the oxidant (cathode off-gas), in the discharge line for the fuel (anode off-gas) or alternatively in both discharge lines. In particular, it is advantageous if the off-gas stream contains large quantities of water in the form of water vapor. However, it is necessary to ensure that the recovery of water from the off-gas stream does not entail the discharge and enrichment of any noxious components which could damage the fuel cell. In a preferred embodiment, the apparatus for condensing out liquid, in particular for condensing out water, is therefore disposed in the discharge line for the oxidant, especially if the oxidant used is oxygen.

The water thus produced can be fed into the fluid reservoir, thus obviating the need for a separate water source. In this case, the fluid reservoir also has the function of an intermediate reservoir. The excess water which is produced during operation of the fuel cell and is not required for moistening the fuel cell membrane is stored in the liquid reservoir and is therefore available when the fuel cell is switched off and is subsequently started up again.

Even when both the fuel and the oxidant are to be humidified, it is advisable to provide a single evaporator in which the antifreeze is evaporated via the heating means and from which conduits directly or indirectly emanate, which feed the fluid stripped of antifreeze into the two feed lines for the fuel and the oxidant. In this arrangement, the evaporated antifreeze is drawn from the evaporator by a separate conduit and, to condense it, is passed into a condenser. The antifreeze condensate formed there is returned to the fluid reservoir by a further conduit.

Alternatively, it is possible, however, for the water present in the fluid reservoir to be obtained by way of a distillation process.

Preferably, a fuel cell system according to the invention as described above can be used to operate a vehicle.

Given the extremely rapid development of fuel cell technology in the vehicle sector, the potential for using the fuel cell system in this way is particularly great at present. Nevertheless, alternative applications are also conceivable. Relevant examples to be mentioned include fuel cells for mobile equipment such as computers or mobile phones up to power station systems. Fuel cell technology is also suitable for decentralized power supply to homes, industrial plants or the like.

Preferably, the present invention is employed in conjunction with fuel cells comprising polymer membranes (PEM). These fuel cells have high electrical efficiency, produce only minimal emissions, exhibit optimal partial-load behavior and are essentially free from mechanical wear.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The FIGURE schematically depicts a fuel cell of the invention

DETAILED DESCRIPTION OF THE PRESENTLY PREFERRED EMBODIMENTS

Referring to the drawing, a fuel cell system 10 which includes a fuel cell 20, a fluid reservoir 30 and a heating means 40 is shown.

The fuel cell 20 includes an anode compartment 21 which is connected to a feed line 23 and a discharge line 24 for a fuel, which may be hydrogen. The fuel cell 20 further includes a cathode compartment 22 which is connected to a feed line 25 and a discharge line 26 for an oxidant, which may be oxygen. The anode compartment 21 and the cathode compartment 22 are separated from one another by a membrane 27, which in the present case is a polymer membrane.

Both the feed line 23 for the fuel and the feed line 25 for the oxidant are connected to the fluid reservoir 30 by means of corresponding conduits 32, 33. The fluid reservoir 30 stores a fluid 31, which in the present case is water. The fluid 31 humidifies the fuel flowing through the feed line 23 and the oxidant flowing through the feed line 25.

The following now describes the method of operation of the fuel cell system 10. To ensure operability of the fuel cell 20 it is necessary for the membrane 27 to be kept moist at all times. During operation of the fuel cell 20, humidification is effected directly by the water produced in the fuel cell 20. Particularly during the start-up phase of the fuel cell 20, no water is yet produced. Nevertheless, even at that time, the membrane 27 needs to be moistened. Because of this, the fuel stream and the oxidant stream are suitably humidified by the fluid reservoir 30, so that the membrane 27 is moistened in the start-up phase of the fuel cell 20 by the humid fuel stream and the humid stream of the oxidant.

Particularly in those cases where the fuel cell system is used in a vehicle, the temperature in the environment of the fuel cell system 10 may drop below the freezing point. In this case there is a risk that the water 31 present in the fluid reservoir 30 may freeze. In such an eventuality, there would not be an adequate moistening of the membrane 27 during the start-up phase of the fuel cell 20.

To prevent freezing of the water 31, it is admixed with an antifreeze, e.g. methanol. An evaporator 44 comprising a heating means 40 is provided so that the antifreeze will not pass to the fuel cell 20. Water 31, borne from the liquid reservoir 30, is heated in the evaporator so that the antifreeze will evaporate and only pure water 31 will pass through the conduit 32, 33 into the feed lines 23, 25 for the fuel and the oxidant, respectively.

In the exemplary embodiment shown, the heating means 40 has a flow conduit 42 which is designed as a closed system and which has a suitable heating medium, e.g. water, oil or the like, flowing therethrough. The flow conduit 42 can be in the form of a coiled pipe in the region of the evaporator 44. This provides a large surface area for the flow conduit 42 for heat exchange purposes. Before the heating medium reaches that region of the flow conduit 42 which is located within the evaporator 44, it is brought to the required temperature by means of a suitable heating element 43, in the present case a catalytic burner. The heating medium thus heated passes through the evaporator 44, where it gives off the heat to the water 31 mixed with antifreeze. As a result, the antifreeze is evaporated and drawn off as vapor via a conduit 46. The heating medium which has cooled after leaving the evaporator 44 passes through the flow conduit 42 back to the burner 43 where it is heated. Then the heated heating medium re-enters the evaporator 44.

An electric heater 41, shown as dashed lines in the figure, can be used as an alternative to the heating means 40 provided with a flow conduit 42. The antifreeze vapor drawn from the evaporator 44 through the conduit 46 passes into a condenser 45, is condensed there by cooling, and recycled in liquid form into the fluid reservoir 30 through the conduit 47.

As shown in the drawing, the system can include two condensers 50, 51 which are inserted into the two discharge lines 24, 26 for the anode gas and cathode gas, respectively, and which condense water from the two off-gas streams of the fuel cell 20. This condensate can be fed into the fluid reservoir 30 by a conduit 52, in order to make up the liquid level if required.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

We claim:

1. A fuel cell system comprising:

a fuel cell, said fuel cell having a first feed line for feeding a fuel to said fuel cell and a second feed line for feeding an oxidant to said fuel cell and a fuel discharge line and oxidant discharge line;

a fluid reservoir wherein at least one of said first and second feed lines is connected thereto;

a heating apparatus disposed in at least one of the first and second feed lines to evaporate fluid, said fluid containing antifreeze, the heating apparatus having sufficient heating power to evaporate the antifreeze and to produce an evaporate;

a condenser to receive and condense the evaporate from the heating apparatus; and a recycle conduit to recycle the condensed evaporate to said fluid reservoir.

2. The fuel cell system of claim 1, further comprising means for collecting said evaporate from the heating apparatus.

3. The fuel cell system of claim 1, wherein the heating apparatus is an electric heater.

4. The fuel cell system of claim 1, wherein the heating apparatus includes a flow conduit for a heating medium.

5. The fuel cell system of claim 4, wherein the heating apparatus is designed as a closed system.

6. The fuel cell system of claim 4, wherein the flow conduit includes a delivery means for the heating medium.

7. The fuel cell system of claim 4, wherein the heating apparatus includes a heating element for the heating medium.

8. The fuel cell system of claim 1, wherein at least one of the fuel and oxidant discharge lines has an apparatus for condensing o: fluid.

9. The fuel cell system of claim 8, wherein the apparatus for condensing out fluid is connected to the fluid reservoir.

10. The fuel cell system of claim 1, further comprising an evaporator which can be heated by the heating apparatus and from which a plurality of conduits emanate directly or indirectly, which feed the fluid stripped of antifreeze into at least one of the first and second feed lines.

11. The fuel cell of claim 10, wherein the evaporated antifreeze can be passed from the evaporator via a conduit into the condenser and from the latter can be recycled as condensate via a conduit into the fluid reservoir.

12. The fuel cell of claim 1, wherein the fluid reservoir is a water reservoir.

13. A motor vehicle having a fuel cell system, said fuel cell system comprising:

a fuel cell, said fuel cell having a first feed line for feeding a fuel to said fuel cell and a second feed line for feeding an oxidant to said fuel cell and a fuel discharge line and oxidant discharge line;

a fluid reservoir wherein at least one of said first and second feed lines is connected thereto;

a heating apparatus disposed in at least one of the first and second feed lines to evaporate fluid to produce an evaporate, said fluid containing antifreeze;

a condenser to receive and condense the evaporate from the heating apparatus; and a recycle conduit to recycle the condensed evaporate to said fluid reservoir.

14. The motor vehicle of claim 13 wherein the heating apparatus is designed as a closed system.

15. A fuel cell system comprising:
- a fuel cell, said fuel cell having a first feed line for feeding a fuel to said fuel cell and a second feed line for feeding an oxidant to said fuel cell and a fuel discharge line and oxidant discharge line;
- a fluid reservoir wherein at least one of said first and second feed lines is connected thereto;
- a heating apparatus disposed in at least one of the first and second feed lines to evaporate fluid to produce an evaporate; said heating apparatus containing a flow conduit for a heating medium and being designed as a closed system;
- a condenser to receive and condense the evaporate from the heating apparatus; and
- a recycle conduit to recycle the condensed evaporate to said fluid reservoir.

16. The fuel cell system of claim 15, further comprising means for collecting said evaporate from the heating apparatus.

17. The fuel cell system of claim 15, wherein the heating apparatus is an electric heater.

18. The fuel cell system of claim 15, wherein the heating apparatus includes a flow conduit for a heating medium.

19. The fuel cell system of claim 18, wherein the flow conduit includes a delivery means for the heating medium.

20. The fuel cell system of claim 15, wherein the heating apparatus includes a heating element for heating the heating medium.

21. The fuel cell system of claim 15, wherein at least one of the fuel and oxidant discharge lines has an apparatus for condensing out fluid.

22. The fuel cell system of claim 21, wherein the apparatus for condensing out fluid is connected to the fluid reservoir.

23. The fuel cell system of claim 21, further comprising an evaporator which can be heated by the heating apparatus and from which a plurality of conduits emanate directly or indirectly, which feed the fluid stripped of antifreeze into at least one of the first and second feed lines.

24. The fuel cell of claim 23, wherein the evaporated antifreeze can be passed from the evaporator via a conduit into the condensor and from the latter can be recycled as condensate via a conduit into the fluid reservoir.

25. The fuel cell of claim 15, wherein the fluid reservoir is a water reservoir.

26. A motor vehicle having a fuel cell system, said fuel cell system comprising:
- a fuel cell, said fuel cell having a first feed line for feeding a fuel to said fuel cell and a second feed line for feeding a fuel to said fuel cell and a second feed line for feeding an oxidant to said fuel cell and a fuel discharge line and oxidant discharge line;
- a fluid reservoir wherein at least one of said first and second feed lines is connected thereto;
- a heating apparatus disposed in at least one of the first and second feed lines to evaporate fluid to produce an evaporate; said heating apparatus containing a flow conduit for a heating medium and being designed as a closed system;
- a condenser to receive and condense the evaporate from the heating apparatus; and
- a recycle conduit to recycle the condensed evaporate to said fluid reservoir.

* * * * *